July 31, 1951 G. W. LEWIS 2,562,196
APPARATUS FOR STARTING ENGINES
Filed May 12, 1948 2 Sheets-Sheet 1
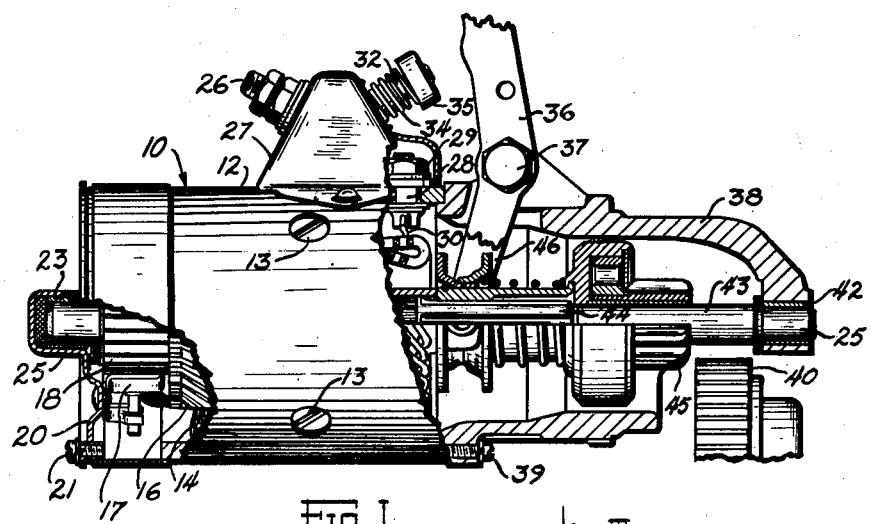
Fig. I
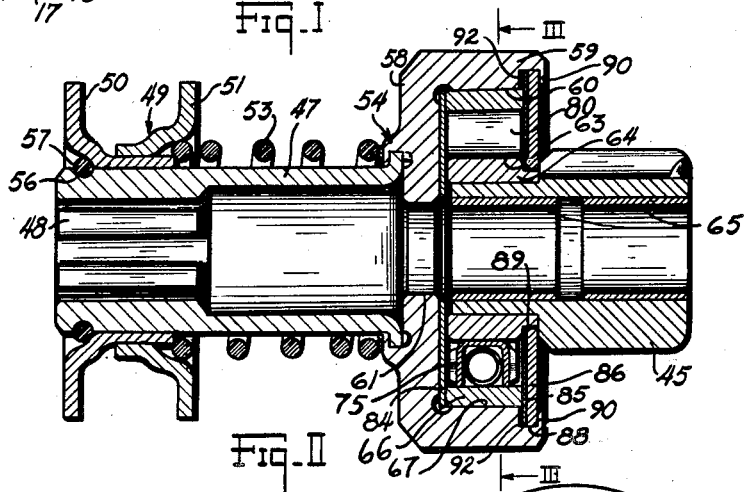
Fig. II
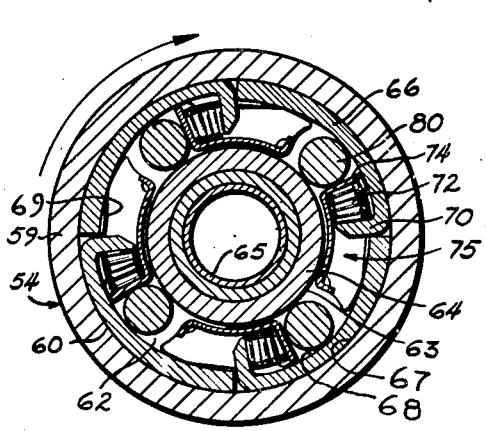
Fig. III
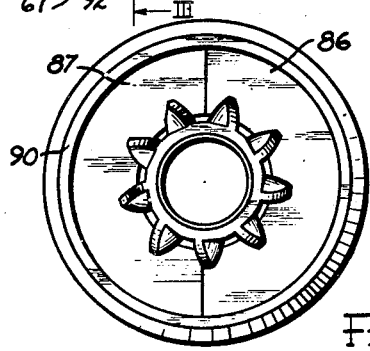
Fig. IV
INVENTOR.
George W. Lewis
BY
Falvey, Souther & Stoltenberg July 31, 1951  G. W. LEWIS  2,562,196
APPARATUS FOR STARTING ENGINES
Filed May 12, 1943  2 Sheets-Sheet 2
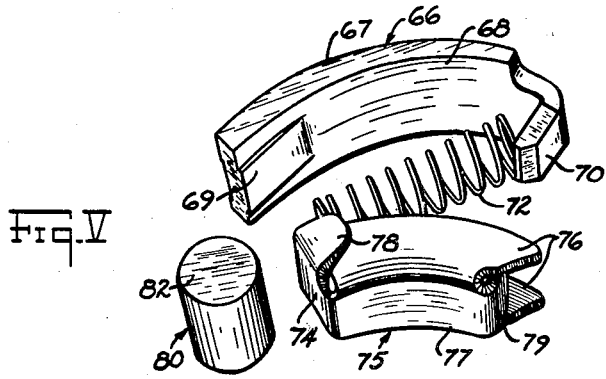
INVENTOR
George W. Lewis
BY
ATTORNEYS Patented July 31, 1951

2,562,196

UNITED STATES PATENT OFFICE 2,562,196

APPARATUS FOR STARTING ENGINES

George W. Lewis, Toledo, Ohio

Application May 12, 1948, Serial No. 26,576

4 Claims. (Cl. 74—6)

This invention relates to apparatus for starting engines and particularly to a starting mechanism for automotive engines arranged to render ineffective any driving relation between the engine and the starting mechanism the instant the engine becomes self-operative.

The invention embraces an engine starter drive comprising a novel arrangement of a clutch having separable units adapted to become in wedged relation with the clutch driving and driven members when starting an engine by a suitable prime mover. The arrangement of the invention is such that slipping or sliding of the separable units momentarily takes place before the load of cranking the engine is taken up by the wedging action of the separable units with the clutch members thus reducing the shock and stresses normally present at the initiation of the engine starting cycle.

The invention comprehends an engine starter drive including an overrunning roller clutch having camming members having a surface provided with different locking angles whereby the roller locking angle increases as the torque load is increased, so that the shock and stresses, which take place when overload torque is applied to the clutch, are reduced to a predetermined limit, preventing thereby destructive deformation of the parts.

The invention comprises a novel overrunning clutch for use with an electric motor and engine starter pinion in which the means operable to establish the driving relation between the clutch members are not directly carried or fixed to the member connected to the motor or the clutch member connected to the engine starter pinion but are capable of relative movement with respect to both members.

The conventional overrunning clutch used in axially shiftable starter drives for the present high speed automotive type engine having a high engine acceleration develops operative failures after a comparatively short time of operation. These failures are more readily manifested when the starter pinion is not shifted out of engagement with the engine flywheel ring gear the instant the engine becomes self-operative mainly on account of the fact that the rollers are subjected to sliding friction and are called upon to rapidly rotate while the clutch is overrunning. In fact most of the overrunning clutches of conventional type, which are intended to overrun, act as friction clutches transmitting an overrunning torque or drag from the engine to the motor. This drag increases as the engine speed is increased and, due to the high ratio between engine flywheel gear and starter pinion in the range of 16 to 1, this drag in a very short time causes undue heating and wear of the clutch-working parts, rendering the drive inoperative and frequently damaging the motor by throwing out the armature windings.

Moreover, some of the conventional overrunning clutches used for starting engines are usually deformed and rendered inoperative after a very short period of use on account of the very high stresses caused by high radial roller loads in cold weather starting applied at the same place to the cam surface and clutch member by the wedging action of the rollers which causes the localization of fatigue on a very small area.

The present invention not only overcomes the performance failures before enumerated but makes possible the successful use, for the clutch-working parts and housing, of relatively inexpensive materials of lower strength and hardness than have previously been found practical. These results are secured by the provision of freely movable wedging units including a cam member and a spring-pressed roller for establishing a driving connection between cylindrical clutch-working members or races. The wedging units are adapted to slip before establishing a driving connection between the clutch members and are provided with several cam zones, one acting as a stress-limiting means to obtain a uniform distribution of the engine starting load on the clutch-working races and thereby avoiding the localized fatigue as well as the destructive or permanent deformation or bending out of round present in overrunning clutches of conventional form. In the clutch of the invention, the rollers are not called upon to rapidly rotate or are subjected to detrimental sliding friction because, during overrunning, the contact pressure of the rollers with the clutch race and cam member is relieved and, due to the action of centrifugal force, the rollers are moved out of contact with the clutch race.

One object of the invention relates to a one-way clutch in association with a prime mover for effectively starting an engine in cold weather, thereby providing an arrangement wherein the shock of taking up the engine starting load is cushioned and whereby the torque transmitted is limited to a predetermined amount which does not exceed the elastic limits of the working parts, or is dependent upon the stalling torque of the prime mover as usually takes place in conventional clutches.

Another object of the invention is to provide a starter drive including an overrunning clutch provided with camming means and coacting spring-pressed rollers forming separable units movable with respect to the clutch members. These separable units are adapted to slip before establishing a driving connection between the clutch members for cranking the engine to thereby reduce the shock and stresses normally present at the initiation of the engine cranking period.

Another object of the invention is to provide a roller clutch including spring-pressed followers for the rollers of novel construction supported without overhang providing ample space for accommodating suitable spring means, the followers arranged to guide the rollers in a square path across the cam and clutch coacting member, thereby preventing possible twisting of the rollers.

A further object of the invention resides in providing an overrunning clutch in which ample space is provided for lubricating means and wherein the coaction of the parts during normal operation prevents leakage of the lubricating means.

A still further object of the invention is to provide an arrangement of a combination of parts for an overrunning clutch which permits their assembly as a one-way clutch for clock or counter-clockwise rotation.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. I is an elevational view with portions broken away and in section illustrating an engine starting apparatus embodying the invention;

Fig. II is a longitudinal sectional view of the overrunning clutch of the invention;

Fig. III is a transverse sectional view on line III—III of Fig. II looking in the direction of the arrows;

Fig. IV is an end view of the clutch looking in the direction of the arrows of Fig. II; and Fig. V is an expanded view showing the component parts of the separable wedging units of the clutch of the invention in disassembled position.

The invention may be incorporated in any type of engine starting apparatus and for a practicable application of its principles, I have elected to illustrate the same as embodied in an electric starter drive for automotive engines. However, it is to be understood that I do not wish to limit the invention to the particular form shown and that I contemplate its use with any suitable prime mover and whenever the invention may be found to be of utility.

Referring to the drawings in which is illustrated an application of the principles of the invention to starting apparatus for engines using a suitable electric motor as a source of power for operating the starting drive of the invention in Fig. I the prime mover is shown as an electric motor 10 having field and armature connected in series. The starting motor 10 comprises a field frame 12 supporting by screws 13 the pole pieces (not shown) and housing the field windings 14 and armature 16. One end of the field circuit is connected to an insulated brush 17 bearing on the commutator 18. The insulated brush 17 is supported on the end plate 20 which is detachably secured to the motor frame 12 by suitable screws 21. The end plate 20 also houses a bearing 22 adapted to rotatably support at one end the motor or power shaft 25. The other motor brush (not shown) is grounded providing a ground return to the electrical source which may be a storage battery or other suitable source of current.

The non-grounded terminal of the suitable source of current is connected with the switch terminal 26 carried by a case 27 mounted on top of the motor frame 12. The case 27 covers an insulated stud 28 passing through the field frame 12, being removably secured thereto by nut 29 and to which is connected as at 30 the other terminal of the motor field circuit constituting the ungrounded motor terminal.

The electrical circuit for the energization of the motor or prime mover is controlled by a movable rod or plunger 32 supported on the switch case 27 insulatingly carrying a movable switch member engageable with a contact connected with terminal 26 and with another contact attached to insulated motor terminal 28. The movable switch member is maintained open by the action of a coil spring 34 located between the case 27 and a cap 35 attached to the end of the switch rod 32.

The plunger 32, which is located in the path of movement of the starter drive shifting lever 36 connected to a mechanism (not shown) under the control of the operator, is adapted to close the circuit of the motor when the lever is moved toward the left. The lever 36 is pivoted on a stub shaft 37 carried by the gear housing 38 which is detachably secured to the motor frame 12 by suitable means such as screws 39. The gear housing 38 is provided with suitable means for securing the starter apparatus of the invention adjacent to a member of the engine to be started such as the flywheel ring gear 40 and houses a bearing 42 adapted to rotatably support the outboard end of the power shaft 25.

The power shaft, which is shown as an extended motor shaft 25, is formed with a smooth reduced section 43 adjacent to a section provided with longitudinal splines 44 serving as means to impart a positive rotary movement to the starting means of the invention permitting longitudinal movement with respect thereto, so that the driving member or starting pinion 45 is moved into and out of meshing engagement with the engine gear 40. The shifting of the pinion 45 into and out of mesh with the engine gear 40 is effected by the movement of the lever 36, which lever has its lower portion 46 straddling the starter drive proper and is provided with suitable projecting rollers in engagement with the spool-shaped shifting collar of the starter drive assembly of the invention. The starting drive is in the form of an assembly which is readily applicable to and detachable from the power shaft 25 comprising generally a drive sleeve connected to a clutch driving member, a pinion connected to a clutch driven member, and separable wedging units associated with the clutch members for establishing a driving couple from the sleeve to the pinion.

The drive sleeve of the starting unit, as shown in Fig. II, is in the form of a tubular member 47 having an enlarged section formed with internal splines 48 for cooperative driving engagement with the splines 44 of the power shaft and carries on its outer surface the ring-like flanged members 50 and 51 forming the shifting collar 49 whereby the starter drive is moved by the lever 36 into and out of meshing engagement with the engine member. The collar 49 is slidable along the sleeve against the coil spring 53 which is normally in a state of compression between the flanged member 51 and the clutch driving member or shell 54 and acts to retain the collar 49 in the position shown in Fig. II against a split ring 57 located in a groove 56 at the end of the sleeve 47. The drive sleeve 47 and clutch driving member 54 are mechanically interconnected.

The overrunning clutch driving member 54 is preferably of cup-shaped configuration and may be considered as the housing or female clutch member comprising an upstanding wall 58 terminating into a horizontally disposed flange 59 defining a recessed section having a cylindrical surface constituting the outer clutch working face 60. The upstanding wall 58 is formed with a central bore 61 adapted to be journaled on the shaft portion 43 to insure the concentric relation of the face 60 with the axis of the power shaft 25.

Located within the recessed portion of the driving member and radially spaced from the clutch face 60 forming an annular chamber 62 is the cylindrical working face 63 of the male clutch or driven member. The clutch face 63 is shown as a cylindrical annular member 64 fixedly secured to the hub of the pinion 45 but, if desired, may be an integral part thereof.

The starter pinion or engine driving member 45 of the starter drive assembly has a central bore provided with a pair of spaced bearing bushings 65 sleeved on shaft section 43 for longitudinal and rotary movement with respect to the power shaft unless clutched thereto by the overrunning clutch of the invention. The bearings 65 of the clutch driven member are in axial alignment with the bearings 61 of the clutch driving member, thus insuring the concentricity and coaxial relationship between clutch working faces 60 and 63 and the power shaft 25.

Interposed between the clutch working faces 60 and 63 in the annular chamber 62 formed between the clutch members are positioned a plurality of freely movable wedging units which operate to establish the driving couple between the clutch members for the transmission of torque from the power shaft 25 to the pinion 45. In the form of the invention, four separable wedging units are shown and each comprise, see Fig. V, a cam member or wedge block in the form of tapered clutch shoe 66, the coil spring 72, the follower 75, and the clutch roller 80. Each wedge block 66 has a cylindrical surface 67 concentric with the clutch face 60 for frictional engagement therewith and is formed with an inner eccentric surface providing two camming zones 68 and 69 of different locking angles for the roller. The zone 68 provides a roller locking angle of approximately two degrees while the zone 69 provides a higher locking angle, and is obtained in the form illustrated by upsetting a section of the wide end of the tapered shoe 66 without increasing its mass. The narrow end of each block is reduced in width and is bent forming the inward projection or abutment 70 with which is in engagement one end of the spring 72 having its other end in engagement with the transverse wall 74 of the roller follower 75.

The follower 75, as shown in Fig. V, is preferably made of sheet metal and comprises the parallel side walls 76 connected by a web or curved section 77. The web 77 terminates at one end into a transverse wall 74 with rearwardly extending ears 78 embracing the outer surface of the walls 76 while its other end is formed as a bent ear or spacer 79 contacting the inner surface of each of the walls 76 insuring their parallel relationship. This construction provides a rigid, hollow member of channel-shaped cross section adapted to accommodate the cam abutment 70 and the spring 72. The spring 72 is retained within the follower 75 in compression to its working length, so that the clutch roller 80 is resiliently urged toward the wide end of the clutch shoe 66 whereby the wedge block 65 and the roller 80 are normally in contacting engagement with the cylindrical clutch working races 60 and 63 respectively of the clutch driving and driven members. The clutch roller 80 is made of hardened steel and is of cylindrical configuration and is of a width corresponding to that of the clutch shoes 66 and transverse wall 74 of the followers 75 and terminates into parallel walls 82.

As shown in Fig. II, the four separable clutch wedging units are located between the steel discs or washers 84 and 85. The washer 84 contacts the wall 58 of the driving member, while the washer 85 is located adjacent to the lock ring segments 86 and 87. The washer 85 and ring segments each have their outer periphery in the annular recess 88 of the clutch driving member and the inner periphery of the segments is received in the groove 89 of the clutch driven member 64, while that of washer 85 permits the free passage of said member. The washer 85 and locking ring segments are retained in position by swedging or ring-staking the end of the recessed section 88, as at 90, so that the driving and driven members of the clutch are held longitudinally in fixed cooperative working relation.

It should be noted that by the arrangement and relationship of the wedging units with respect to the clutch working surfaces 60 and 62 an ample space is provided for retaining a suitable lubricant to last throughout the life of the clutch. In addition, the relationship of the flat washers 84 and 85 and locking ring segments 86 and 87, associated with a sealing gasket 92, provides means for avoiding leakage of the lubricant under normal conditions of operation of the clutch. The flat washers 84 and 85 also serve as wear-absorbing means for taking any sliding action relative to the clutch members of the wedging units at the beginning and ending of the one-way torque-transmitting cycle. Moreover, the construction of the follower 75 is such that the same is retained without overhang and, due to its width, the roller is guided in a square path without cant or tilt avoiding the possibility of detrimental contact of the walls 82 of the roller with either of the metal washers 84 or 85. This assembly makes possible the successful use for the clutch housing 54 and locking segments 86 and 87 of relatively inexpensive material of lower strength and hardness than have previously been found practicable.

The wedging units, as shown in Fig. V, can be assembled within the annular chamber 62 between the clutch working surfaces 60 and 63 for a one-way torque transmission in either a clock or counter-clockwise rotation. In Fig. III, the wedging units, each inclusive of cam 66, spring 72 and roller 80, are shown as assembled for a one-way clutch-transmitting torque in a clockwise rotation. However, changing their relationship, so that narrowing ends of the tapered section are directed in opposition to the arrow, a clutch can be produced to transmit a one-way torque in a counterclockwise direction.

It should be noted that each of the coil springs 72 of the separable wedging units is assembled in the follower 75 in compression to its working length causing the cam shoe 66 and cooperating roller 80 to have an excitation load to effect the transmission of torque when the driving member rotates relative to or turns faster than the driven member of the clutch. In addition, the oil or lubricant in chamber 62 is distributed forming an oil film on clutch working parts and that the excitation load is not sufficient to prevent the maintenance or the accumulation of the oil film between the clutch working face 60 and the surface 67 of each cam member 66. However, as soon as the driving member rotates relative to or turns faster than the driven member 54, a radial load on the clutch faces 60 and 63 is effected by the wedging action of the separable units caused by movement of the roller towards the wide end of the cam member 66. This radial load or wedging action causes the oil film to be squeezed or pushed out before frictional driving engagement takes place between the clutch surface 60 with the surface 67 of separable units as well as of the roller 80 with the camming zone 68 of the wedge block and with the clutch working surface 63 of the driven member. During the short interval of time that the oil film is being pushed out, slipping or sliding of the wedging units with respect to the clutch working faces 60 and 63 occurs and the oil film acts as a cushion, damping out and thereby reducing the shock and stresses normally present when the load is taken up by the clutch at the initiation of the engine starting cycle.

I secure several novel advantages by the inclusion of camming means provided with roller locking angles of different values such as the zones 68 and 69 whereby the roller locking angle increases as the torque load is increased. This arrangement prevents the roller load on the working parts of the overrunning clutch from increasing to a destructive point under heavy loads or overloads, thereby avoiding localized fatigue as well as destructive deformation which occurs in most conventional clutches. The cam zone 68 produces a greater roller load for a given torque than the cam zone 69 and thereby is very effective for penetrating or squeezing out the grease or lubricant film at the initiation of the torque transmission, particularly in cold weather. The cam zone 69, having a higher roller locking angle, which produces a lower roller load for a given torque than zone 68, is very effective under heavy loads, as the zone 69 becomes effective when, due to stresses of a heavy load, the roller 80 climbs from the cam zone 68 into contact with the cam zone 69. The cam zone 69 then locks the roller without increasing the roller load and thereby the stresses are kept from rising. This prevents the stresses from exceeding the elastic limits of the housing and other parts. In addition, when the roller 80 is wedged by zone 69, due to heavy loads, this zone limits the torque overload which may be transmitted by the clutch and permits mometary slipping without injury, thus preventing the destruction or permanent deformation of the clutch under heavy loads.

It can be seen that by the arrangement of the invention any deflection that may take place will not be localized over the same small area as it will be taken up by the cam shoe 66. Moreover, the deflection and stresses are stopped from exceeding the elastic limits of the clutch working parts, particularly the working face of the shell member or housing 54.

On the other hand, by the arrangement of the clutch of the invention, undue wear is prevented when overrunning of the clutch takes place because a very effective lubrication of the parts subjected to sliding contact is provided. This effective lubrication is secured because, during the overrunning, the centrifugal force set up in the lubricant has a tendency to carry the oil away from the center toward the outside, thus providing satisfactory lubrication to the clutch working parts and insuring an oil film between the clutch working face 60 and the surface 67 of the cam members where sliding contact occurs. The clutch working face 60 and surface 67 are subject to sliding contact because, when the driven member of the clutch or pinion 45 turns at a faster speed than the driving member 54, the wedge block 66 tends to move and its roller 80 moves toward its narrow section, thus reducing the radial load, and slippage between the working surface 60 of the driving member and surface 67 of the wedge block takes place providing free overrun between the driving and driven members of the clutch. During overrunning, the rollers are not called upon to rapidly rotate or are subjected to detrimental sliding friction because the contact pressure of the roller with the clutch driven member is relieved and sliding friction takes place between the cam members and the clutch face of the driving member. The fact that the rollers are prevented from tilting, do not rotate at very high speed, and are relieved of any sliding friction, coupled with the effective lubrication for the clutch working surface subjected to sliding contact, are some of the features contributing to the outstanding performance and long life of the overrunning clutch of the invention.

The operation of the starting apparatus of the invention may be summarized as follows: In normal operation the parts are in the position shown in Fig. I. In the form of the invention shown, the clutching units are assembled, so that the pinion 45 will be rotated by the motor and transmit torque when the shaft 25 turns in a clockwise direction, as indicated by the arrow shown in Fig. III.

The engine is started by moving the shifting lever 36 counterclockwise to shift the pinion 45 in mesh with the engine gear 40 and to engage the plunger 32 to thereby close the starter motor switch to energize the motor for cranking the engine.

The instant the motor is energized after the pinion 45 is in mesh with the engine gear 40, the working face 60 of the clutch driving member tends to move ahead of the working face 63 of the clutch driven member. This action affects the wedging of the separable clutching units therebetween, whereby the oil or grease film is pushed out concurrently with a momentary slippage before frictional driving engagement takes place between the clutch working faces and the separable clutching units. The time during which the grease film is being pushed out, and the concurrently slipping of the clutch working units with respect to the clutch working faces, provides a means for damping or cushioning the shock caused by the taking up of the engine cranking load. Moreover, under some conditions of operation, particularly starting and cranking engines in extremely cold weather, the radial roller load causes a deflection, allowing each roller 80 to move over the camming zone 68 into engagement with the camming zone 69. When the roller 80 is in engagement with the camming zone 69, the radial load is prevented from rising and thus the torque load, which may be transmitted by the clutch for cranking the engine, is limited to a predetermined amount.

The limitation of the torque transmitted to a predetermined value by the arrangement of the invention is accomplished by the fact that when the torque load on the clutch is increased over a predetermined value, a slippage takes place between the clutch working races and the wedging units. By this arrangement, the torque transmitted by the clutch is not dependent upon the stalling torque of the motor as occurs with conventional constructions but is limited to a predetermined amount which does not exceed the elastic limits of the working parts and prevents their permanent setting or deformation.

When the engine becomes self-operative, the pinion 45 is accelerated, due to its connection with the engine flywheel gear 40, to a speed greater than the speed of the prime mover or electric motor 10. The acceleration of the pinion 45 causes the rollers 75 to roll out of locking engagement, moving the same toward the abutment 70. Concurrently the electric motor 10, since it is being relieved of the engine cranking load, speeds up toward terminal speed, setting up a centrifugal force on the rollers 80 causing the same to roll outwardly toward the narrow end of the wedging block 66 compressing springs 72. This double action causes the release and immediate overrun of the clutch, as well as freeing the rollers 80 of any contacting engagement with the pinion race or clutch working face 63 of the driven member.

In case of gear tooth abutment, prior to the full meshing of the chamfered teeth of the pinion with the engine gear 40, the spring 53 will yield, allowing the closing of the motor circuit, whereupon the armature rotates moving shaft 25 to turn the teeth of the pinion into meshing registration with the teeth of the engine gear. When registration occurs, the pinion 45 will be moved rapidly into mesh with the engine gear 40 due to the sudden release of the compressed spring 53.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed is:

1. Starting apparatus for internal combustion engines comprising, in combination, a prime mover, a pinion movable into mesh with the flywheel gear of an engine to be started for transmitting torque from the prime mover to the engine, a clutch having an outside cylindrical clutch working face connected with the prime mover, an inside cylindrical clutch member connected with the pinion, arcuate tapered shoes having two camming zones whereby the torque transmitted to the engine is limited to a predetermined amount, a single spring-pressed roller coacting with each tapered shoe to form separable units adapted to become wedged between said cylindrical clutch working face and the inside cylindrical clutch member to establish a driving relation therebetween to drive the pinion when cranking the engine by the prime mover, said separable units adapted to be released from wedging relation when the engine becomes self-operative rendering ineffective any driving relation between the engine and the prime mover.

2. Starting apparatus for engines comprising, in combination, a prime mover, a driven member movable into engagement with a member of an engine to be started for transmitting torque from the prime mover to the engine, an overrunning clutch having an inner cylindrical clutch working race connected with the prime mover, a cylindrical clutch member connected with said driven member radially spaced from said race forming an annular chamber, a lubricant retained in said chamber, a plurality of freely movable independent cams, a single spring-pressed roller coacting with each cam to form separable units in said annular chamber, said units adapted to become in wedged relationship between said cylindrical clutch working race and cylindrical clutch member to drive said driven member by the prime mover for cranking the engine to start the same, the arrangement being such that the lubricant acts as damping means at the initiation of the engine starting cycle and when the engine becomes self-operative the release of the wedged relationship of the separable units takes place rendering ineffective any driving relation between the starting apparatus and the engine or vice versa.

3. Starting apparatus for internal combustion engines comprising, in combination, an electric motor, a driven member movable into driving relation with a member of an engine to be started, a cylindrical clutch working face connected with the electric motor, an inside cylindrical clutch member connected with said driven member, separable units each comprising a freely movable cam shoe and a single spring-pressed roller, said units being interposed between said clutch working face and said clutch member and adapted to momentarily slip and thereafter become wedged therebetween to drive the driven member for starting the engine by the electric motor whereby the taking up of the engine cranking load is cushioned, the separable units operable to effect the release of their wedged relation when the engine tends to rotate the driven member at a higher rate of speed than the rate of speed of the electric motor.

4. Starting apparatus for internal combustion engines comprising, in combination, an electric motor, a pinion movable into mesh with the flywheel gear of an engine to be started, an overrunning clutch having an outside cylindrical clutch working face connected with the electric motor, an inside cylindrical clutch working face connected with the pinion, cam members provided with a surface having roller locking angles of different values whereby the roller locking angle increases as the torque load is increased, and a single spring-pressed roller coacting with each of said cam members forming freely movable separable units adapted to become wedged between said cylindrical clutch working faces to drive the pinion when cranking the engine, said separable units adapted to be released when the engine becomes self-operative rendering ineffective any driving relation between the engine and starting apparatus.

GEORGE W. LEWIS.

REFERENCES CITED

The following references are of record in the file of this patent:

UNITED STATES PATENTS

| Number | Name | Date |
| --- | --- | --- |
| 1,618,915 | Constantinesco | Feb. 22, 1927 |
| 1,828,359 | Chryst | Oct. 20, 1931 |
| 1,893,231 | Floyd | Jan. 3, 1933 |
| 2,127,969 | Dingwerth | Aug. 23, 1938 |
| 2,211,053 | Critchfield | Aug. 13, 1940 |
| 2,275,177 | Crans | Mar. 3, 1942 |
| 2,308,471 | Schwartz | Jan. 12, 1943 |